(12) United States Patent
Trail et al.

(10) Patent No.: US 9,574,749 B2
(45) Date of Patent: Feb. 21, 2017

(54) ADAPTIVE MULTI-WAVELENGTH LASER ILLUMINATOR

(71) Applicant: Raytheon Company, Waltham, MA (US)

(72) Inventors: Nicholas D. Trail, Tucson, AZ (US); Michael J. Aden, Vail, AZ (US); Gregory P. Hanauska, Tucson, AZ (US); James P. Mills, Austin, TX (US)

(73) Assignee: Raytheon Company, Waltham, MA (US)

( * ) Notice: Subject to any disclaimer, the term of this patent is extended or adjusted under 35 U.S.C. 154(b) by 287 days.

(21) Appl. No.: 13/930,701

(22) Filed: Jun. 28, 2013

(65) Prior Publication Data

US 2015/0184835 A1   Jul. 2, 2015

(51) Int. Cl.
| | | |
|---|---|---|
| *F21V 14/06* | (2006.01) | |
| *F21V 5/00* | (2015.01) | |
| *F41H 13/00* | (2006.01) | |
| *F21V 8/00* | (2006.01) | |
| *F21W 111/00* | (2006.01) | |
| *F21W 131/40* | (2006.01) | |
| *G02B 27/30* | (2006.01) | |
| *F21Y 101/00* | (2016.01) | |

(52) U.S. Cl.
CPC ............... *F21V 14/06* (2013.01); *F21V 5/00* (2013.01); *F41H 13/0056* (2013.01); *G02B 6/0008* (2013.01); *F21W 2111/00* (2013.01); *F21W 2131/40* (2013.01); *F21Y 2101/00* (2013.01); *F21Y 2115/30* (2016.08); *G02B 27/30* (2013.01)

(58) Field of Classification Search
CPC .......... F21V 14/06; F21V 5/00; G02B 6/0008; G02B 27/30; F21W 2111/00; F21W 2131/40; F41H 13/0056
USPC ......... 362/551–555, 259, 112, 111, 373, 187
See application file for complete search history.

(56) References Cited

U.S. PATENT DOCUMENTS

| | | | |
|---|---|---|---|
| 5,161,207 A * | 11/1992 | Pikulski ........................ | 385/96 |
| 6,190,022 B1 | 2/2001 | Tocci et al. | |
| 6,431,731 B1 * | 8/2002 | Krietzman .................... | 362/259 |
| 6,793,364 B2 * | 9/2004 | Cramer et al. ................ | 362/112 |

(Continued)

OTHER PUBLICATIONS

International Search Report dated Apr. 14, 2014 in connection with International Patent Application No. PCT/US2013/071732, 5 pages.

(Continued)

*Primary Examiner* — Anh Mai
*Assistant Examiner* — Arman B Fallahkhair

(57) ABSTRACT

A system includes one or more lasers, a collimator, and a controller. The one or more lasers are configured to generate laser illumination. The collimator is configured to adjust at least one of a degree of collimation, a divergence, and an intensity of the laser illumination and to direct the laser illumination towards one or more targets. The controller is configured to control the one or more lasers and the collimator in order to adjust the laser illumination directed at the one or more targets, and the controller is configured to control the one or more lasers and the collimator differently in different operating modes. Example operating modes could include a spotlight mode, a single-color dazzler or pulsating mode, a multi-color dazzler or pulsating mode, a communication mode, and an infrared-based operation mode.

22 Claims, 7 Drawing Sheets

(56) References Cited

U.S. PATENT DOCUMENTS

| | | | |
|---|---|---|---|
| 7,239,655 B2* | 7/2007 | Casazza | F41H 13/0056 359/15 |
| 7,277,223 B2* | 10/2007 | Baun et al. | 359/399 |
| 7,483,454 B2 | 1/2009 | Hauck et al. | |
| 7,497,586 B2 | 3/2009 | Eisenberg et al. | |
| 8,636,384 B2* | 1/2014 | Battis et al. | 362/259 |
| 8,724,097 B2* | 5/2014 | Pohl | A61F 9/00 250/205 |
| 8,967,811 B2* | 3/2015 | Jaffe | F21V 9/16 353/122 |
| 8,967,846 B2* | 3/2015 | Jaffe et al. | 362/574 |
| 2005/0185403 A1 | 8/2005 | Diehl | |
| 2005/0279205 A1 | 12/2005 | Rode | |
| 2007/0039226 A1 | 2/2007 | Stokes | |
| 2007/0274353 A1 | 11/2007 | Hauck et al. | |

OTHER PUBLICATIONS

Written Opinion of International Searching Authority dated Apr. 14, 2014 in connection with International Patent Application No. PCT/US2013/071732, 5 pages.

European Examination Report dated Sep. 15, 2016 in connection with European Application No. 13818537.6, 6 pages.

\* cited by examiner

106 — LASER OUTPUT TO OPTICAL COLLIMATOR BENCH

208 — LASER OUTPUT FROM LASER

ADAPTIVE MULTI-WAVELENGTH LASER ILLUMINATOR

TECHNICAL FIELD

This disclosure is directed generally to laser illumination systems. More specifically, this disclosure relates to an adaptive multi-wavelength laser illuminator.

BACKGROUND

Various systems have been developed over the years for non-lethal targeting of unfriendly or hostile forces. For example, "dazzlers" are electro-optical (EO) devices that can temporarily disorient or blind targets using directed laser illumination. As particular examples, dazzlers could emit visible light that causes disorientation, nausea, or temporarily blindness in unfriendly or hostile forces. Dazzlers could also emit infrared light to interfere with night vision devices or other infrared-based sensors. These types of devices have a wide range of uses, such as crowd control, defense, and perimeter protection.

SUMMARY

This disclosure provides an adaptive multi-wavelength laser illuminator, which could be operated in various modes such as a general illuminator/spotlight mode and single and/or multi-color dazzler mode(s).

In a first embodiment, a system includes one or more lasers, a collimator, and a controller. The one or more lasers are configured to generate laser illumination. The collimator is configured to adjust at least one of a degree of collimation, a divergence, and an intensity of the laser illumination and to direct the laser illumination towards one or more targets. The controller is configured to control the one or more lasers and the collimator in order to adjust the laser illumination directed at the one or more targets, and the controller is configured to control the one or more lasers and the collimator differently in different operating modes.

In a second embodiment, a method includes generating laser illumination using one or more lasers. The method also includes adjusting at least one of a degree of collimation, a divergence, and an intensity of the laser illumination using a collimator. The method further includes directing the laser illumination towards one or more targets. In addition, the method includes controlling the one or more lasers and the collimator in order to adjust the laser illumination directed at the one or more targets, where the one or more lasers and the collimator are controlled differently in different operating modes.

In a third embodiment, an apparatus includes one or more lasers configured to generate laser illumination. The apparatus also includes a collimator configured to adjust at least one of a degree of collimation, a divergence, and an intensity of the laser illumination and to direct the laser illumination towards one or more targets. The one or more lasers and the collimator are adjustable to alter the laser illumination directed at the one or more targets, and the one or more lasers and the collimator are operable to function differently in different operating modes.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, non-lethal electro-optical (EO) devices can be used in a wide variety of settings and for various purposes, including crowd control, defense, and perimeter protection. Often times, these different settings and purposes have different operational requirements. For example, it is often necessary or desirable to limit the amount of laser energy directed at a target in order to avoid causing permanent eye damage. However, the maximum laser energy that is output by a non-lethal EO device can vary depending (among other things) on the range to a target, the optical transmission properties of the intervening atmosphere, and the amount of focus of the laser energy onto the target.

Conventional EO systems typically are not designed to operate in different dynamic environments and are instead designed for a single type of use. As a result, conventional EO systems often lack the ability to address unfriendly or hostile forces at reasonable stand-off ranges in different environments and are prone to exploitation or threat adaptation obsolescence. For example, some conventional EO systems use larger and more powerful "green" dazzler laser technology to achieve increased stand-off range (green laser light is near the peak response of the human eye). However, these systems can be defeated by forces with laser goggles or other notch-filter eye protection since the EO energy is contained within a very narrow wavelength spectrum (typically much less than 1.0 nanometers). Not only that, with increasing constraints on system size, weight, and power (SWAP) and increasing constraints on cost, the selection of a single non-lethal effector is difficult. This disclosure provides an adaptive multi-wavelength laser illuminator that can quickly be adapted to different mission sets, concepts of operation (CONOP), or operational environments.

Figure 1:
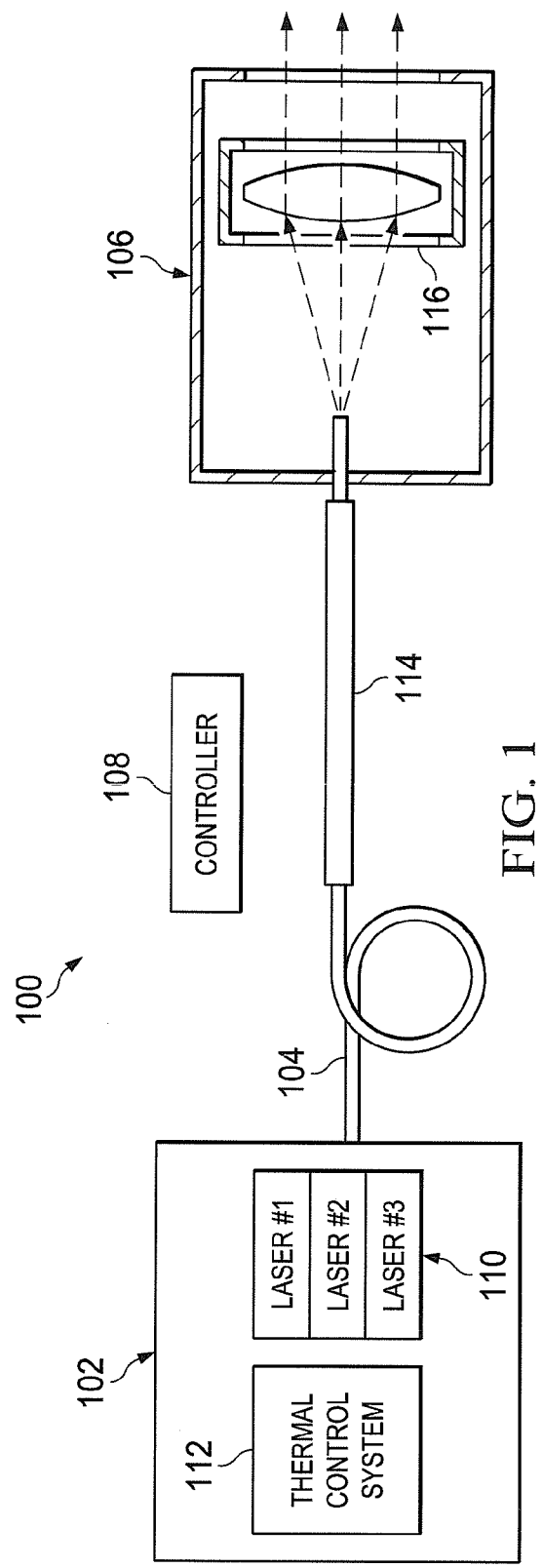
FIG. 1 illustrates a block diagram of an example adaptive multi-wavelength laser illuminator system according to this disclosure.

FIG. 1 illustrates a block diagram of an example adaptive multi-wavelength laser illuminator system 100 according to this disclosure. As shown in FIG. 1, the illuminator system 100 includes a laser integration bench 102, at least one optical fiber 104, an optical collimator bench 106, and a controller 108. The laser integration bench 102 generates laser illumination at one or more wavelengths, and the laser illumination is coupled into an optical fiber waveguide formed by the optical fiber 104. The optical fiber 104 transports the laser illumination to the optical collimator bench 106, which can collimate the laser illumination and output a beam suitable for a given environment or use. By nature of the optical fiber 104, the optical collimator bench 106 can be set at or near the laser integration bench 102 or remotely distant from the laser integration bench 102 (such as on the order of meters to kilometers or even more). This can allow for more optimum control, efficient protection, and thermal control of the laser sources while situating the optical system output where required for suitable use.

The controller 108 controls the overall operation of the illuminator system 100. For example, the controller 108 could control which wavelength(s) of laser illumination are generated by the laser integration bench 102. The controller 108 could also control the optical power level and duty-cycle that each laser wavelength is operated at, which can include controlling what pulse frequency outputs and equivalent "color" mixing are used. In addition, the controller 108 could control the degree of collimation of the laser illumination by the optical collimator bench 106, such as by controlling a motor that sets the optical fiber's focus relative to a collimator.

In this example, the laser integration bench 102 includes multiple lasers 110 and a thermal control system 112. Each laser 110 represents any suitable structure configured to generate illumination at one or more wavelengths. The laser integration bench 102 could include any number of lasers 110. In some embodiments, multiple lasers 110 are used, and their outputs could have any suitable wavelengths or span any suitable wavelength ranges. For instance, the lasers 110 could generate laser illumination in the visible and near infrared (VNIR) spectrum and/or in the short-wave infrared (SWIR) spectrum.

In particular embodiments, the lasers 110 include red, blue, and green lasers, which could be operated and electronically addressed independently to control what colors are mixed and output. For example, with the appropriate red, blue, and green wavelength lasers, nearly the full spectrum of visible light can be created and presented onto a target, including control over the white balance and intensity of the light. Also, in particular embodiments, each notional color laser can be formed using one or more individual laser cavities, such as diode or solid-state diode-pumped laser media. For instance, a red spectrum laser could include tens to hundreds of notionally lower-power red laser diodes that can span the wavelength range from about 610 to about 700 nanometers. In this manner, any or all of these laser diodes can be operated, allowing near full coverage of the upper part of the visible spectrum to combat target adaptation.

The approach of using multiple laser sources across a range of colors, coupled with an optional multi-mode fiber waveguide as the optical fiber 104, may allow finer control over the output radiant intensity uniformity by mixing individual speckle patterns (which average out in the final beam). The net effect is a more even and uniform downrange optical irradiance on a target, where the irradiance has any suitable spatial envelope (such as top-hat or Gaussian). This allows a higher operational power output with the same system non-lethal safety factor. Moreover, the use of a distributed laser gain media to achieve the total optical power improves the system mean-time between failure (MTBF) and redundancy capability, as any given laser cavity failure may have only a small percentage effect on the system's performance and can be actively compensated for by the controller 108. In addition, multiple lasers within any given defined "color-space" can also be used with infrared sources, such as near infrared (NIR) or short-wave infrared (SWIR) sources, as discussed below.

The thermal control system 112 controls the temperature of various components in the laser integration bench 102, such as one or more of the lasers 110. For example, the wavelength(s) or output optical power of laser illumination generated by a laser 110 can vary based on the temperature of that laser 110. The thermal control system 112 can control or adjust the temperature of a laser 110 so that the output wavelength(s) or peak power capability from that laser 110 can be precisely controlled. The thermal control system 112 includes any suitable structure for controlling or adjusting the temperature of at least one other component, such as a passive or active air-cooled fin structure or a thermal electric cooler (TEC) interface.

The optical fiber 104 represents any suitable structure configured to transport laser illumination. For example, the optical fiber 104 could represent an optical fiber waveguide that can be coiled and that is surrounded by a protective sheathing 114, such as a multi-mode fiber waveguide. The optical fiber 104 can have any suitable length, which allows the laser integration bench 102 and the optical collimator bench 106 to be separated by any suitable distance (including separations ranging from several meters to several kilometers or more as required by an end user). This separation can allow multiple lasers to be used in the laser integration bench 102 in a package that is remote from the optical collimator bench 106.

The optical collimator bench 106 receives laser illumination from the laser integration bench 102 via the optical fiber 104. The optical collimator bench 106 controls how the laser illumination is directed to one or more targets. For example, the optical collimator bench 106 includes a collimator 116 that can control the boresight and divergence of the laser illumination. This allows the laser illuminator system 100 to control whether laser illumination is focused on a single target (such as for a "dazzling" mode of operation) or spread over multiple targets (such as for a weak "dazzling" or a general spotlight mode of operation). As a particular example, the collimator 116 could use a variable analog focus mechanism to control whether the laser illuminator system 100 functions with a spotlight or dazzler/pulsating effect. The spotlight effect can be generally characterized as light of a substantially constant color (such as white light) continuously or near-continuously illuminating one or more targets. The dazzler/pulsating effect can be generally characterized as light of one or more colors flashing or pulsating at one or more frequencies.

The degree of severity of a dazzler/pulsating effect can also be controlled by what the optical collimator bench 106 has set the optical divergence. For instance, the system 100 may start with a wide search beam or near white light to locate one or more targets (whether in search mode or queued) and can then maintain the same divergence but communicate intent by starting the flashing or pulsating of the dazzler functionality. At that wider divergence product, the dazzler impact is typically reduced, but it allows variable color and/or pulsating frequencies to communicate protective boundaries. If further action is needed, the system 100 can decrease the divergence in real-time to exponentially increase the downrange irradiance on one or more targets while still choosing to present one or more colors and any number of frequencies (such as from DC to the kilohertz range, with a possible focus from DC to 50 Hz for the human visual system).

The optical collimator bench 106 includes any suitable structure for controlling the collimation of laser illumination. The optical collimator bench 106 can allow dynamic adjustment of the degree of collimation or angular radiant intensity of the laser illumination, such as from many degrees down to milli-radian values or lower, as limited by the optical entendue.

The controller 108 controls the overall operation of the illuminator system 100. For example, the controller 108 can control the operation of the lasers 110 to control the wavelength(s) of laser illumination directed at one or more targets. The controller 108 can also control the collimation of the laser illumination so that the laser illumination is directed at a smaller area (such as at a single target) or at a larger area (such as at a collection of targets). In some embodiments, the controller 108 can control the illuminator system 100 to ensure that the amount of laser energy directed at any individual target does not exceed a specified threshold, such as the Maximum Permissible Exposure (MPE), which is a well-known safe level of laser exposure to the human visual system. Note that this could include allowing the total laser energy output from the illuminator system 100 to exceed this threshold at close ranges, as long as the laser output diverges enough so that the threshold is not exceeded at any individual target that is illuminated. The controller 108 can perform any other or additional operations to control an adaptive multi-wavelength laser illuminator. The controller 108 includes any suitable computing or processing device(s), such as one or more microprocessors, microcontrollers, digital signal processors, field programmable gate arrays, or application specific integrated circuits. In particular embodiments, the controller 108 could execute software or firmware instructions for controlling the generation and use of laser illumination.

The illuminator system 100 can be used to provide various illumination effects in different modes of operation. For example, the illuminator system 100 could be configured to operate in any of the following modes.

White Spotlight:

The illuminator system 100 can generate a white spotlight, meaning a beam of light that covers a desired area and is composed primarily of white light (or at least light that appears substantially white). The white light could be generated in any suitable manner. For instance, laser illumination from multiple lasers 110 can be combined to generate white light. The divergence, irradiance, and white balance can be controlled to support this mode of operation.

Single-Color Dazzler:

The illuminator system 100 can generate illumination primarily of a single color and operate with a dazzler/pulsating effect, such as by flashing light of the single color at one or more frequencies. The single color could have any suitable wavelength(s), such as one or more wavelengths between about 400 nm to about 700 nm (for human vision) or from about 400 nm to about 1600 nm (for electronic near-visible or short-wave infrared cameras). The single color could also be generated in any suitable manner, such as by using laser illumination from one or more lasers 110. The divergence and irradiance can be controlled to support this mode of operation.

Multi-Color Dazzler:

The illuminator system 100 can generate illumination of multiple colors and operate with a dazzler/pulsating effect, such as by flashing light of the multiple colors at one or more frequencies. The multiple colors could be used sequentially or in an overlapping manner. The multiple colors could have any suitable wavelengths, such as two or more wavelengths (between about 400 nm to about 700 nm or between about 400 nm to about 1600 nm) associated with different colors. The divergence, irradiance, and temporal pulse behavior can be controlled to support this mode of operation. As a particular example, the illuminator system 100 can generate illumination having a multi-color "blinking" effect, which can induce nausea and dizziness in a portion of population (a secondary effect beyond temporary blindness).

Color-Based Communications:

The illuminator system 100 can generate different illumination to support visual or other types of communication. For example, red, yellow, and green laser illumination can be used to generate stop, warning, and go indications, respectively. Also, one or multiple colors of laser illumination can be used to communicate with remote personnel in order to make "friend or foe" determinations. The beams generated here could represent white, colored, or multi-colored spotlights, and the colors can be selected to convey any suitable information.

Infrared-Based Functions:

The illuminator system 100 could generate infrared illumination useful for performing various operations. For example, one or more lasers 110 could generate near infrared or short-wave infrared illumination. This type of illumination can be used to disable night-vision devices or other infrared-based devices. This type of illumination can also be used to perform range-finding functions.

Note that a particular implementation of the illuminator system 100 could be configured to operate in all or any subset of these operational modes. As a specific example, the infrared-based functions could be omitted in a particular implementation of the illuminator system 100. Also note that various operational modes could involve the use of external components. For example, an external receiver could be used to measure time of flight during range-finding operations (although an internal receiver could also be used). As another example, an external range-finder could be used in conjunction with the illuminator system 100.

The illuminator system 100 can be reconfigured easily to operate in different operating modes, which supports the use of the illuminator system 100 in different and dynamic environments. For example, the illuminator system 100 can dynamically shift between spotlight and dazzler functionality easily and rapidly (even almost instantaneously). This provides the ability for an operator to target individuals in a group without losing threats of interest. This also provides the ability to rapidly interlace spotlight and dazzler functionality if desired. The spotlight and dazzler functionality can support variable divergence (variable beam footprints) in either mode and/or variable color (white-balance or spectrum across a "rainbow" of colors) in either mode. In particular embodiments, interlaced spotlight and dazzler functionality can be supported using a plano-plano window rotated into and out of the beam path or using a second optical path in the optical collimator bench 106. Note, however, that other approaches could be used to support the spotlight and dazzler functionality. For instance, if allowed transition times are long enough (such as on the order of milliseconds), this can be accomplished through the use of a variable focus mechanism in the optical collimator bench 106 (an example of which is described below).

As can be seen here, the illuminator system 100 functions as a multi-use and multi-effect non-lethal EO system. The illuminator system 100 can be provided in a compact and environmentally-robust package (such as one that is operational in one or more MIL-SPEC environments), thereby helping to ensure that the illuminator system 100 can be used in a wide variety of applications while satisfying various SWAP and cost constraints. The illuminator system 100 can also be easily upgraded or modified, such as by supporting the replacement of the laser integration bench 102 without replacement of the optical collimator bench 106 (or vice versa). Further, separating the laser integration bench 102 and the optical collimator bench 106 allows the illuminator system 100 to be used in a larger number of platforms, including those that could not support a single package containing both the laser integration bench 102 and the optical collimator bench 106. Moreover, the operation of the illuminator system 100 can be adapted in real-time to changing threats, such as by switching the mode of operation if a target attempts to implement countermeasures against the current mode of operation. In addition, by utilizing a common optical fiber waveguide, laser illumination can be guided to the optical collimator bench 106, which can project a beam with a variable (tunable) divergence downrange, such as from about 0.05° to about 50° full-angle divergence. This allows the illuminator system 100 to dynamically vary the output wavelength (color spectrum), total optical power, and beam footprint at ranges of up to one kilometer or more. The overall effect is a highly dynamic non-lethal EO system that can be used in a wide variety of applications.

Although FIG. 1 illustrates a block diagram of one example of an adaptive multi-wavelength laser illuminator system 100, various changes may be made to FIG. 1. For example, the laser integration bench 102 could include any suitable number of lasers each capable of generating illumination at one or multiple wavelengths. Also, the functional division shown in FIG. 1 is for illustration only. Various components in FIG. 1 could be combined, further subdivided, or rearranged and additional components could be added according to particular needs.

Figure 2:
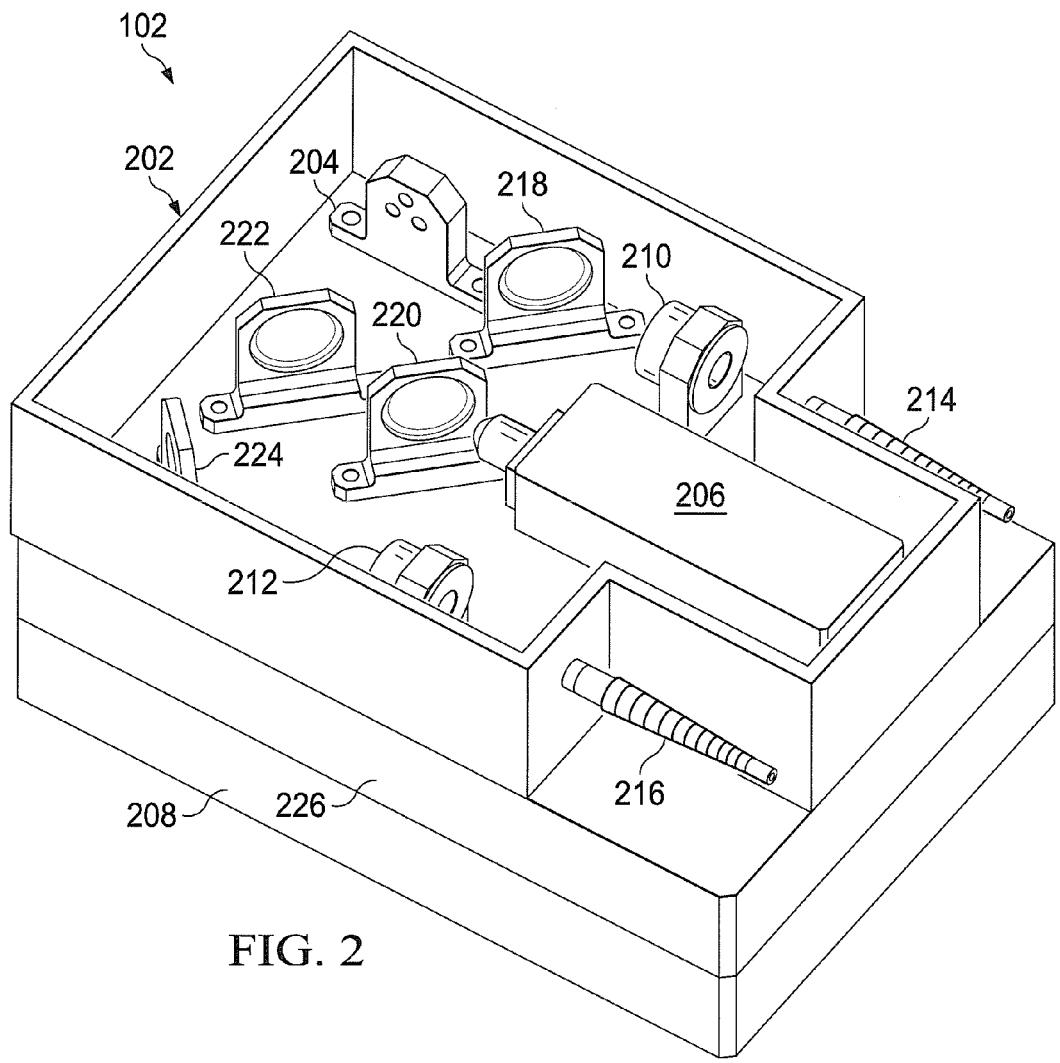
FIGS. 2 and 3 illustrate an example laser integration bench in an adaptive multi-wavelength laser illuminator according to this disclosure.
Figure 3:
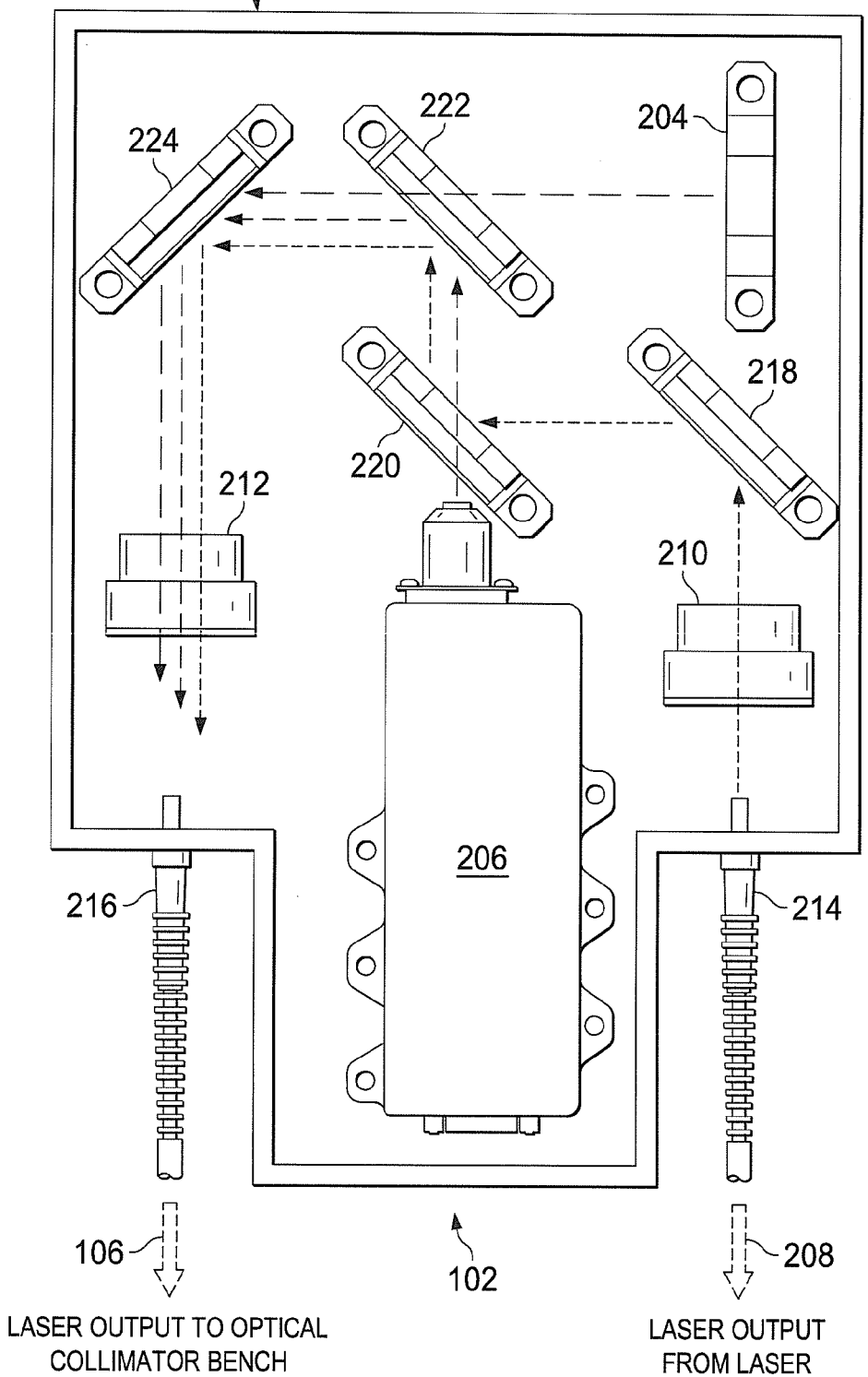

FIGS. 2 and 3 illustrate an example laser integration bench 102 in an adaptive multi-wavelength laser illuminator according to this disclosure. As shown in FIGS. 2 and 3, the laser integration bench 102 includes a housing 202, which represents a structure in which various other components of the laser integration bench 102 reside. The housing 202 can be formed from any suitable material(s) (such as plastic or metal) and in any suitable manner.

The laser integration bench 102 also includes multiple lasers 204-208, which could represent the various lasers 110 shown in FIG. 1. Each laser 204-208 represents any suitable structure for generating laser illumination. For example, the laser 204 can include multiple "blue" laser diodes (such as three laser diodes) mounted and collimated in a tower. Also, the laser 206 can represent a "red" laser diode, such as a commercial off-the-shelf (COTS) or other red collimated laser source. In addition, the laser 208 can represent a "green" laser, such as a COTS or other green collimated laser source.

The laser integration bench 102 further includes fiber couplers 210-212, which are configured to be coupled to optical fibers 214-216, respectively. Each fiber coupler 210-212 includes any suitable structure capable of coupling to an optical fiber, such as a refractive or reflective coupler. Each optical fiber 214-216 includes any suitable optical fiber capable of transporting laser illumination. In this example, the laser 208 resides outside of the housing 202, and the laser output from the laser 208 is provided into the housing 202 via the optical fiber 214 and the fiber coupler 210. Note, however, that the laser 208 could also reside within the housing 202, and the components 210, 214 could be omitted. Also, other mechanisms could be used to provide a beam from the laser 208 into the housing 202. The output beam from the laser integration bench 102 is provided to the optical collimator bench 106 via the fiber coupler 212 and the optical fiber 216 (which could represent the optical fiber 104 in FIG. 1).

Various mirrors 218-224 (such as metal and dichroic mirrors) are used in the laser integration bench 102 to redirect the various beams of laser illumination. For example, the mirror 218 can be used to redirect the beam from the laser 208 towards the mirror 220. The mirror 220 can be used to redirect the beam from the laser 208 towards the mirror 222, and the mirror 220 can also allow the beam from the laser 206 to pass through the mirror 220. The mirror 222 can be used to redirect the beams from the lasers 206-208 towards the mirror 224, and the mirror 222 can also allow the beam from the laser 204 to pass through the mirror 222. The mirror 224 can be used to redirect the beams from the lasers 204-208 (individually or collectively) to the fiber coupler 212. In this way, the mirrors 218-224 can be used to align the beams entering the optical fiber 216. Each mirror 218-224 includes any suitable structure for reflecting and optionally transmitting light. For instance, the mirrors 218 and 224 could represent fold mirrors, and the mirrors 220 and 222 could represent fold dichroic mirrors.

In this example, a cooling device 226 is placed between the laser 208 and the housing 202. The cooling device 226 (which could represent part of the thermal control system 112) can be used to help maintain suitable temperatures of the components in the laser integration bench 102. The cooling device 226 represents any suitable structure for cooling components, such as an air-cooled fin structure or thermoelectric cooler.

Although FIGS. 2 and 3 illustrate one example of a laser integration bench 102 in an adaptive multi-wavelength laser illuminator, various changes may be made to FIGS. 2 and 3. For example, the laser integration bench 102 shown here is an example implementation only. Any other suitable laser integration bench having any number of lasers and other optical components for directing laser illumination could be used. Also, while described as having blue, red, and green lasers 204-208, the laser integration bench 102 could include any other or additional lasers, such as one or more infrared lasers.

Figure 4:
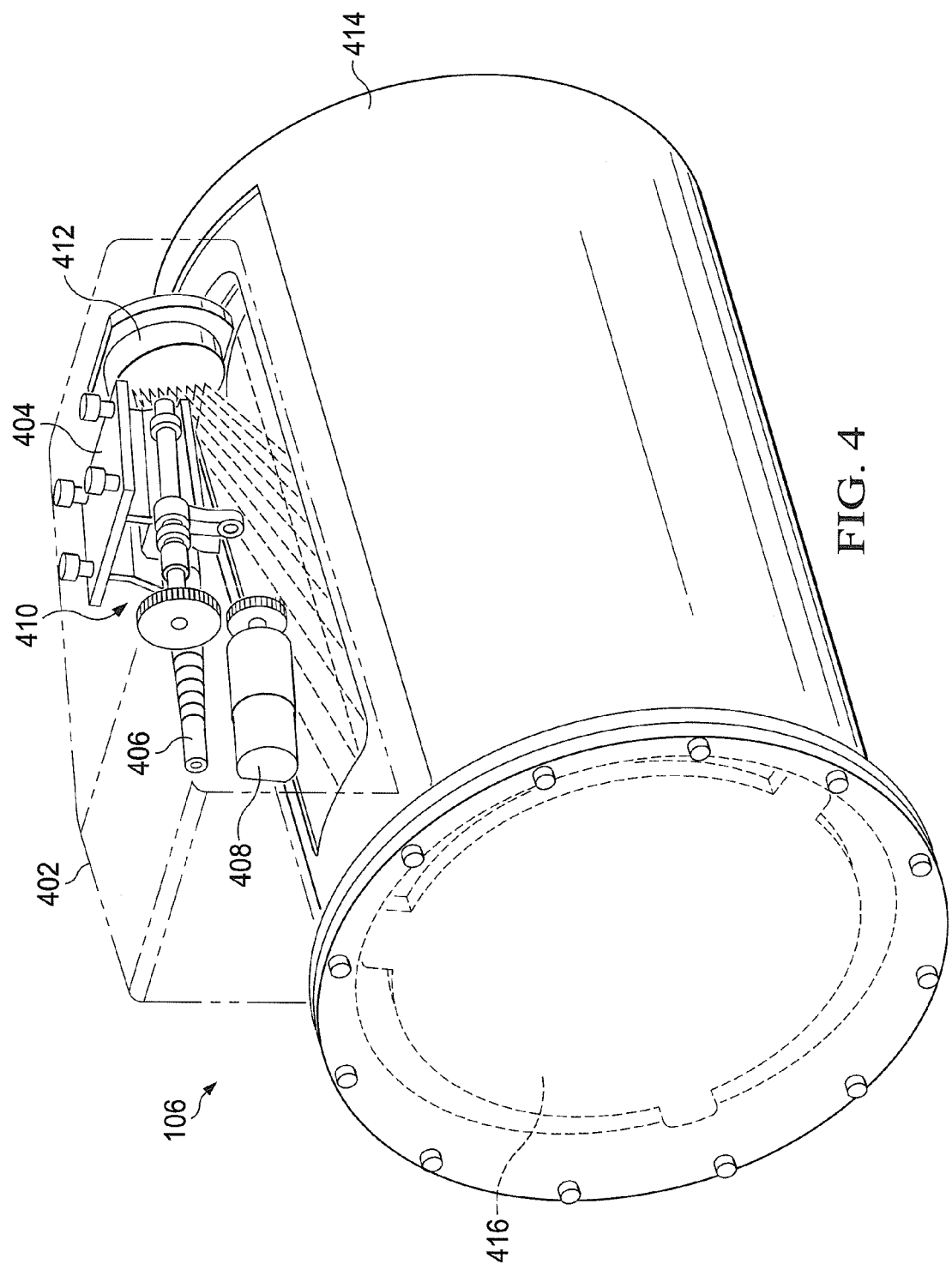
FIGS. 4 through 6 illustrate an example optical collimator bench in an adaptive multi-wavelength laser illuminator according to this disclosure.
Figure 5:
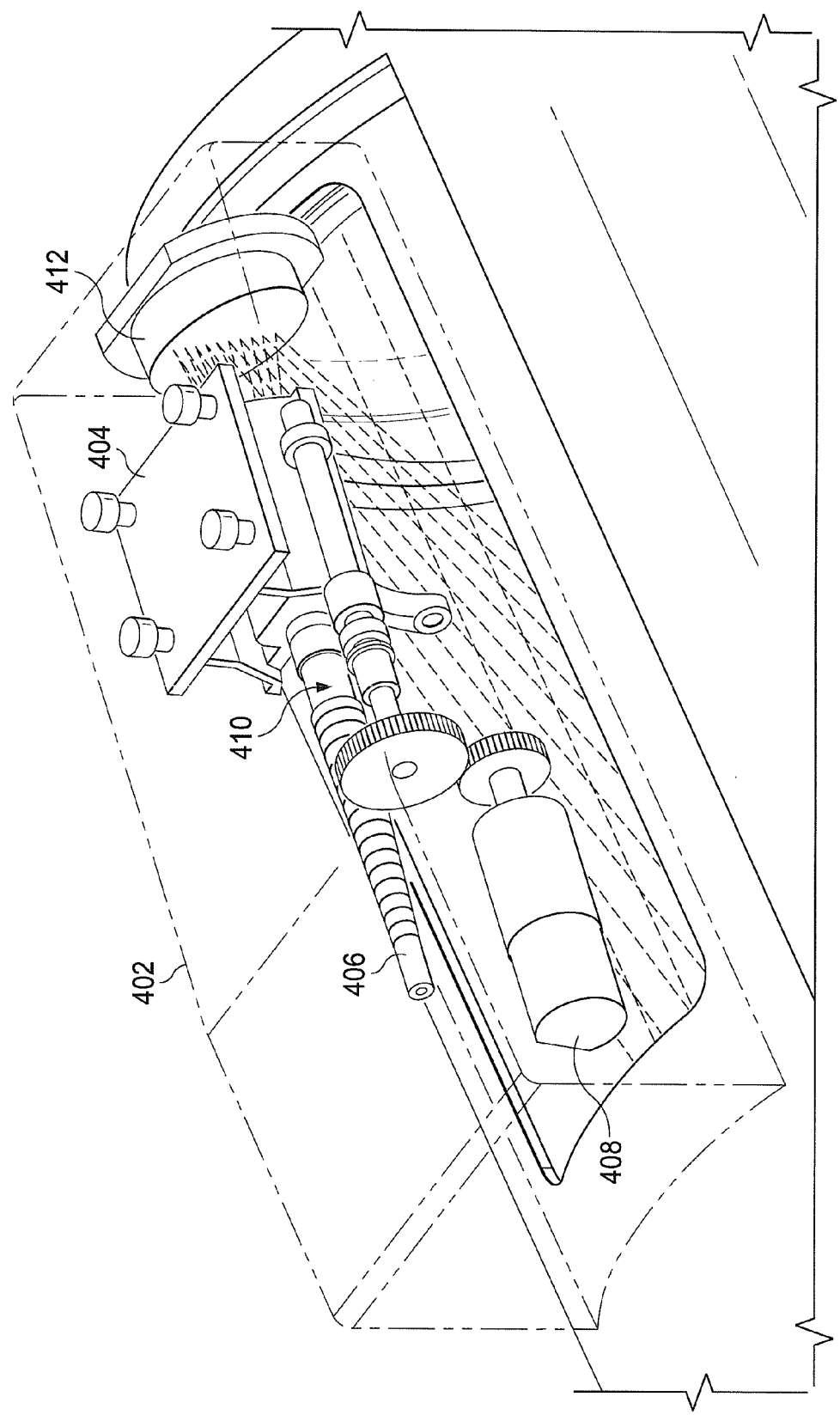
Figure 6:
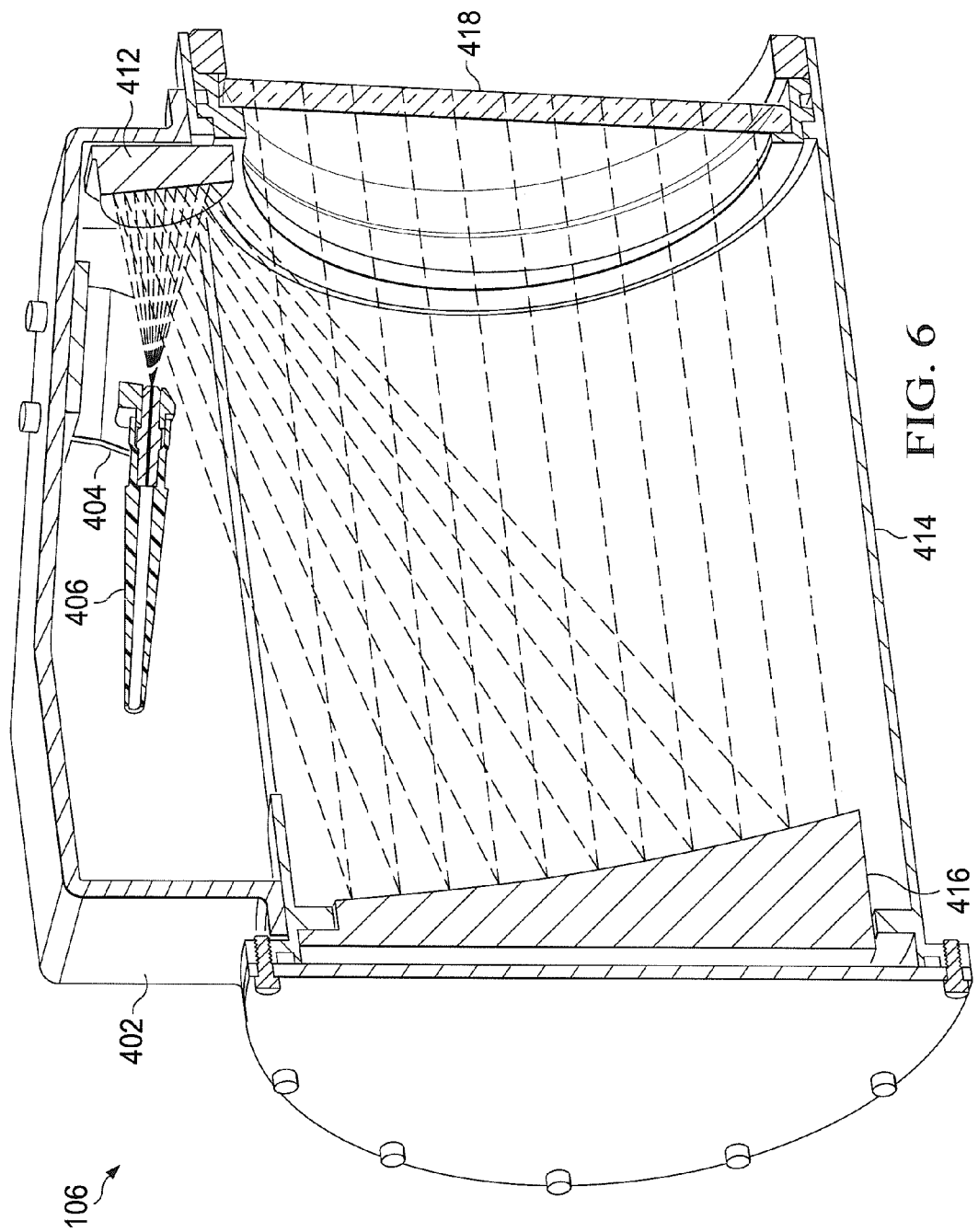

FIGS. 4 through 6 illustrate an example optical collimator bench 106 in an adaptive multi-wavelength laser illuminator according to this disclosure. As shown in FIGS. 4 through 6, the optical collimator bench 106 includes a first housing 402, which represents a structure in which various other components of the optical collimator bench 106 reside. The housing 402 can be formed from any suitable material(s) (such as plastic or metal) and in any suitable manner.

A fiber mount 404 is connected to the housing 402. The fiber mount 404 represents a structure on which an optical fiber 406 can be mounted. The optical fiber 406 could represent the optical fiber 104 of FIG. 1 and/or the optical fiber 216 of FIGS. 2 and 3. The fiber mount 404 includes any suitable structure configured to receive and retain a portion of an optical fiber. In this example, the fiber mount 404 includes a structure having a top plate that is bolted to the first housing 402 and downwardly extending legs, which engage a moveable bracket for holding the optical fiber 406. Of course, the fiber mount 404 could include other designs or be coupled to the first housing 402 in any other suitable manner.

A drive motor 408 and a translation stage 410 are used to adjust the position of the optical fiber 406 relative to a fold mirror 412. For example, the drive motor 408 could operate to rotate a first gear, which rotates a second gear in the translation stage 410. This rotation can move the bracket in the fiber mount 404 that holds the optical fiber 406 forward or backward. By changing the distance between the output of the optical fiber 406 and the fold mirror 412, the drive motor 408 and translation stage 410 can alter the divergence of the laser illumination. The drive motor 408 includes any suitable motor or other structure for causing movement of an optical fiber. The translation stage 410 includes any suitable structure for translating operation of a motor or other structure into movement of an optical fiber. The translation stage 410 could include hard stops at position limits for the optical fiber, thereby limiting the amount of travel that the optical fiber 406 can undergo. The hard stops could be factory-tuned and set to establish minimum and maximum divergence limits that the system can achieve. Note that this arrangement of the drive motor 408 and the translation stage 410 for moving the optical fiber 406 is for illustration only, and other mechanisms can be used to move an optical fiber or provide variable focus.

The mirror 412 reflects the laser illumination from the optical fiber 406 into a second housing 414, which represents a structure in which additional components of the optical collimator bench 106 reside. The mirror 412 includes any suitable structure for reflecting light. The housing 414 can be formed from any suitable material(s) (such as plastic or metal) and in any suitable manner.

In this example, the mirror 412 reflects the laser illumination towards a second mirror 416, which then reflects the laser illumination towards a window 418. The second mirror 416 includes any suitable structure for reflecting light, such as an off-axis primary mirror. The window 418 may represent the exit point for the laser illumination from the illuminator system 100, meaning the laser illumination passes through the window 418 and from there travels to at least one target. The window 418 may represent any suitable structure through which laser illumination can pass, such as a tilted window made from suitably transparent plastic, glass, or other media.

Although FIGS. 4 through 6 illustrate one example of an optical collimator bench 106 in an adaptive multi-wavelength laser illuminator, various changes may be made to FIGS. 4 through 6. For example, the optical collimator bench 106 shown here is an example implementation only. Any other suitable device or system using any other suitable optical collimation technique could be used. Also, the use of a drive motor and translation stage to move part of a fiber mount represents one example technique for moving an optical fiber. Any other suitable technique could be used to control the divergence or other or additional characteristic(s) of laser illumination.

Figure 7:
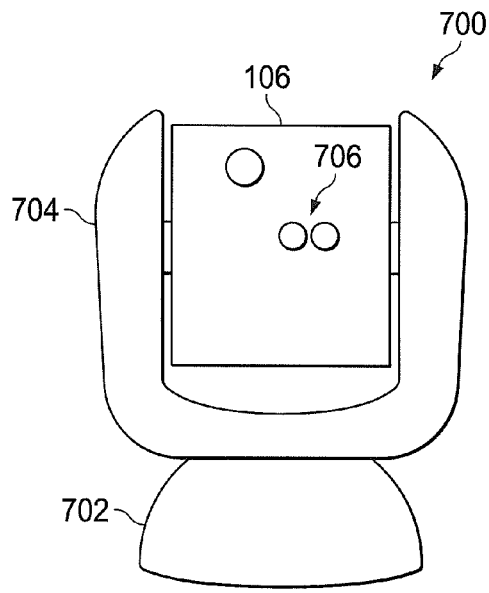
FIG. 7 illustrates an example implementation of an optical collimator bench in an adaptive multi-wavelength laser illuminator according to this disclosure.

FIG. 7 illustrates an example implementation of an optical collimator bench 106 in an adaptive multi-wavelength laser illuminator according to this disclosure. As shown in FIG. 7, a structure 700 includes the optical collimator bench 106 mounted on a pair of gimbals 702-704. The first gimbal 702 can be mounted on a fixed or movable object (such as a vehicle) and is used to rotate the optical collimator bench 106 horizontally. The second gimbal 704 is mounted on the first gimbal 702 and is used to rotate the optical collimator bench 106 vertically. This allows the optical collimator bench 106 to be easily aimed in any suitable direction.

The laser integration bench 102 can be mounted away from the optical collimator bench 106 shown in FIG. 7. For example, the gimbal 702 could be mounted to the top of a vehicle, and the laser integration bench 102 can be secured within the vehicle or at another location on the vehicle.

Note that any additional functionality can be incorporated into the structure 700 of FIG. 7. For example, the structure 700 could include one or more cameras or other sensors 706 mounted on the gimbals 702-704. The sensors 706 could be mounted in the same housing as the optical collimator bench 106 or in a separate housing. The sensors 706 can be used to view a given location and any potential targets, aim the output beam from the optical collimator bench 106, or sense environmental conditions. In general, the structure 700 could support any additional functionality, regardless of whether that functionality is related to operation of the laser illuminator system 100.

Although FIG. 7 illustrates one example implementation of an optical collimator bench 106 in an adaptive multi-wavelength laser illuminator, various changes may be made to FIG. 7. For example, this represents one specific use of the laser illuminator system 100. The laser illuminator system 100 can be used in any other suitable manner.

Figure 8:
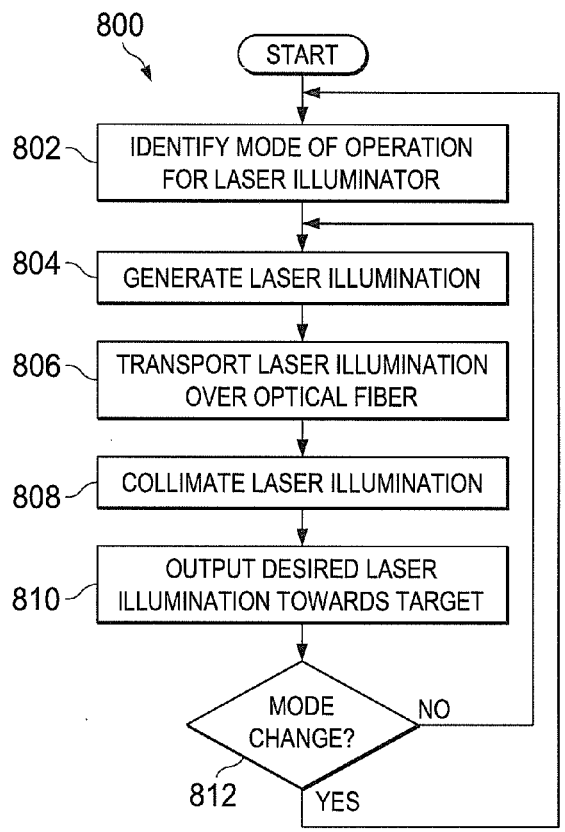
FIG. 8 illustrates an example method for an adaptive multi-wavelength laser illumination operational approach according to this disclosure.

FIG. 8 illustrates an example method 800 for an adaptive multi-wavelength laser illumination operational approach according to this disclosure. As shown in FIG. 8, the operational mode of a laser illuminator is identified at step 802. This could include, for example, the controller 108 determining whether to operate the laser illuminator system 100 as a spotlight or dazzler and with one or multiple colors. This could also include the controller 108 determining whether to operate the laser illuminator system 100 to perform infrared-based functions such as range-finding or sensor jamming.

Laser illumination is generated at step 804, transported over at least one optical fiber at step 806, collimated at step 808, and output towards one or more targets at step 810. This could include, for example, the laser integration bench 102 generating laser illumination in line with the identified operational mode. For instance, the wavelength(s) of the generated illumination can be based on whether the illuminator system 100 is operating in a mode that uses white light, light of a single color, or light of multiple colors. This could also include the optical collimator bench 106 controlling the collimation of the laser illumination in line with the identified operational mode. For example, the collimator 116 could focus the laser illumination more for a single target or less for multiple targets. The collimator 116 could also focus the laser illumination more during color-based communications and less when operating as a spotlight. The specific operations in each mode can vary depending on the implementation and depending on the desired function or purpose of that mode. The controller 108 can control the operation of the laser integration bench 102 and the optical collimator bench 106 based on the desired mode of operation. The controller 108 may also ensure that the amount of laser energy directed at any individual target does not exceed a safety or other threshold level, given one or more factors such as atmospheric conditions and target distance.

A determination is made whether to change the operational mode at step 812. If no change is made, the process returns to step 804 to continue generating laser illumination according to the current operational mode. Otherwise, the process returns to step 802 to identify a new operational mode, and steps 804-810 are repeated for the new operational mode. Note that little or no interruption in the light output of the illuminator system 100 may be seen during a switch in operating modes. Also note that the operating mode of the illuminator system 100 can be changed rapidly and repeatedly at any desired periodic or non-periodic interval based on any suitable input.

Although FIG. 8 illustrates one example of a method 800 for an adaptive multi-wavelength laser illumination operational approach, various changes may be made to FIG. 8. For example, while shown as a series of steps, various steps in FIG. 8 could overlap or occur in parallel.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "color" refers generally to light having a single wavelength or multiple wavelengths that give the appearance of a single color. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a housing;
   multiple lasers configured to generate laser illumination, at least one of the multiple lasers residing outside the housing and at least one of the multiple lasers residing inside the housing;
   a collimator configured to adjust at least one of a degree of collimation, a divergence, and an intensity of the laser illumination and to direct the laser illumination towards multiple targets;
   a cooler configured to cool the housing and the at least one laser that resides outside the housing, wherein the cooler is positioned between the housing and the at least one laser that resides outside the housing; and
   a controller configured to:
      control the multiple lasers and the collimator in order to adjust the laser illumination directed at the multiple targets,
      control the multiple lasers and the collimator differently in different operating modes, and
      control the multiple lasers and the collimator so that an amount of laser energy received at each individual target is less than a threshold amount.

2. The system of claim 1, further comprising:
   multiple mirrors configured to align beams from the multiple lasers, the multiple mirrors including a fold mirror.

3. The system of claim 2, wherein the multiple mirrors include a dichroic mirror configured to transmit and reflect light at different wavelengths.

4. The system of claim 1, further comprising:
   an optical fiber coupling the multiple lasers and the collimator.

5. The system of claim 4, wherein:
   the collimator comprises a first mirror and a second mirror, the first mirror configured to reflect the laser illumination towards the second mirror; and
   the system further comprises a motor and a translation stage configured to move a portion of the optical fiber in order to adjust a distance between an output of the optical fiber and the first mirror.

6. The system of claim 1, wherein:
   the operating modes include at least one spotlight mode and at least one dazzler or pulsating mode;
   the laser illumination in the at least one spotlight mode includes light of a substantially constant color and that is substantially continuous; and
   the laser illumination in the at least one dazzler or pulsating mode includes light of one or more colors and that flashes at one or more frequencies.

7. The system of claim 1, wherein the operating modes include at least one communication mode in which the laser illumination has one or more colors for conveying specified information to the one or more targets.

8. The system of claim 1, wherein the operating modes include at least one infrared-based operation in which the laser illumination includes infrared light.

9. The system of claim 1, wherein the threshold amount is based on a Maximum Permissible Exposure (MPE) defining a safe level of laser exposure to a human visual system.

10. The system of claim 1, wherein the controller is configured to control the multiple lasers and the collimator to repeatedly change a current operating mode of the system.

11. The system of claim 1, wherein:
    the controller is configured to control the multiple lasers and the collimator so that an amount of laser energy in the laser illumination at close range exceeds the threshold amount; and
    the controller is configured to identify the threshold amount based on a distance to each individual target.

12. A method comprising:
    generating laser illumination using multiple lasers, at least one of the multiple lasers residing outside a housing and at least one of the multiple lasers residing inside the housing;
    cooling the housing and the at least one laser that resides outside the housing with a cooler, wherein the cooler is positioned between the housing and the at least one laser that resides outside the housing;

adjusting at least one of a degree of collimation, a divergence, and an intensity of the laser illumination using a collimator;

directing the laser illumination towards multiple targets; and controlling the multiple lasers and the collimator in order to adjust the laser illumination directed at the multiple targets, the multiple lasers and the collimator controlled differently in different operating modes, the multiple lasers and the collimator controlled so that an amount of laser energy received at each individual target is less than a threshold amount.

13. The method of claim 12, wherein:

the operating modes include at least one spotlight mode and at least one dazzler or pulsating mode;

the laser illumination in the at least one spotlight mode includes light of a substantially constant color and that is substantially continuous; and the laser illumination in the at least one dazzler or pulsating mode includes light of one or more colors and that flashes at one or more frequencies.

14. The method of claim 12, wherein the operating modes include at least one communication mode in which the laser illumination has one or more colors for conveying specified information to the one or more targets.

15. The method of claim 12, wherein the operating modes include at least one infrared-based operation in which the laser illumination includes infrared light.

16. The method of claim 12, wherein the threshold amount is based on a Maximum Permissible Exposure (MPE) defining a safe level of laser exposure to a human visual system.

17. The method of claim 12, further comprising:

repeatedly changing a current operating mode of the laser illuminator.

18. An apparatus comprising:

a housing;

multiple lasers configured to generate laser illumination, at least one of the multiple lasers residing outside the housing and at least one of the multiple lasers residing inside the housing;

a collimator configured to adjust at least one of a degree of collimation, a divergence, and an intensity of the laser illumination and to direct the laser illumination towards multiple targets; and a cooler configured to cool the housing and the at least one laser that resides outside the housing, wherein the cooler is positioned between the housing and the at least one laser that resides outside the housing;

wherein the multiple lasers and the collimator are adjustable to alter the laser illumination directed at the multiple targets, the multiple lasers and the collimator operable to function differently in different operating modes, the multiple lasers and the collimator adjustable so that an amount of laser energy received at each individual target is less than a threshold amount.

19. The apparatus of claim 18, further comprising:

multiple mirrors configured to align beams from the multiple lasers.

20. The apparatus of claim 18, further comprising:

an optical fiber coupling the housing to the at least one laser that resides outside the housing.

21. The apparatus of claim 18, wherein:

the collimator comprises a first mirror and a second mirror, the first mirror configured to reflect the laser illumination towards the second mirror; and the apparatus further comprises a motor and a translation stage configured to move a portion of an optical fiber in order to adjust a distance between an output of the optical fiber and the first mirror.

22. The apparatus of claim 18, wherein:

the multiple lasers and the collimator are adjustable so that an amount of laser energy in the laser illumination at close range exceeds the threshold amount; and the threshold amount is based on a Maximum Permissible Exposure (MPE) defining a safe level of laser exposure to a human visual system and a distance to each individual target.

* * * * *